(12) United States Patent
Bang et al.

(10) Patent No.: US 11,654,784 B2
(45) Date of Patent: May 23, 2023

(54) ELECTRICALLY DRIVEN AUTOMOBILE WITH A POWER PACK AND RETROFIT THEREOF

(71) Applicant: BLUE WORLD TECHNOLOGIES HOLDING APS, Aalborg Ost (DK)

(72) Inventors: Mads Bang, Stovring (DK); Peter Leander Jensen, Svenstrup (DK); Anders Risum Korsgaard, Aalborg (DK); Martin Stenild Gron, Skals (DK)

(73) Assignee: BLUE WORLD TECHNOLOGIES HOLDING APS, Aalborg Ost (DK)

( * ) Notice: Subject to any disclaimer, the term of this patent is extended or adjusted under 35 U.S.C. 154(b) by 0 days.

(21) Appl. No.: 17/769,915

(22) PCT Filed: Oct. 8, 2020

(86) PCT No.: PCT/DK2020/050277
§ 371 (c)(1),
(2) Date: Apr. 18, 2022

(87) PCT Pub. No.: WO2021/078343
PCT Pub. Date: Apr. 29, 2021

(65) Prior Publication Data
US 2022/0379742 A1 Dec. 1, 2022

Related U.S. Application Data

(60) Provisional application No. 62/923,677, filed on Oct. 21, 2019.

(51) Int. Cl.
*B60K 1/04* (2019.01)
*B60K 15/03* (2006.01)
(Continued)

(52) U.S. Cl.
CPC ............... *B60L 50/70* (2019.02); *B60K 1/04* (2013.01); *H01M 8/2475* (2013.01);
(Continued)

(58) Field of Classification Search
CPC ...... B60L 50/70; B60L 50/75; B60L 2200/46; H01M 8/2475
See application file for complete search history.

(56) References Cited

U.S. PATENT DOCUMENTS 5,251,721 A 10/1993 Ortenheim
5,641,031 A * 6/1997 Riemer ................... B60L 50/71
180/68.5
(Continued)

FOREIGN PATENT DOCUMENTS

CN 202357902 U 8/2012
EP 3474368 B1 7/2020
(Continued)

OTHER PUBLICATIONS

International Search report for PCT/DK2020/050277, prepared by the Nordic Patent Institue dated Dec. 21, 2020, 7 pages.

*Primary Examiner* — Emma K Frick
(74) *Attorney, Agent, or Firm* — Brooks Kushman P.C.; John E. Nemazi

(57) ABSTRACT

An electrically driven automobile with a power pack and retrofit thereof. An electric power pack in an electrically powered automobile is provided for retrofit where part of the batteries are substituted by a fuel cell system in order to extend the travelling range of the automobile.

8 Claims, 2 Drawing Sheets

(51) Int. Cl.
*B60L 50/70* (2019.01)
*H01M 8/2475* (2016.01)

(52) U.S. Cl.
CPC ............ *B60K 2001/0438* (2013.01); *B60K 2015/03315* (2013.01); *B60L 2200/46* (2013.01)

(56) References Cited

U.S. PATENT DOCUMENTS

| | | | | |
|---|---|---|---|---|
| 6,378,637 | B1 * | 4/2002 | Ono | H01M 50/20 180/68.5 |
| 6,843,336 | B2 * | 1/2005 | Chernoff | B60G 17/015 296/35.3 |
| 6,978,855 | B2 | 12/2005 | Kubota et al. | |
| 7,108,091 | B2 * | 9/2006 | Guidry | B62D 33/02 180/68.1 |
| 7,441,615 | B2 * | 10/2008 | Borroni-Bird | B62D 21/10 180/402 |
| 7,469,759 | B2 * | 12/2008 | Botzelmann | B60L 50/71 180/68.5 |
| 7,637,334 | B2 * | 12/2009 | Kaneko | B60K 15/013 903/908 |
| 8,381,850 | B2 * | 2/2013 | Asai | H01M 8/248 180/291 |
| 10,150,357 | B2 * | 12/2018 | Landgraf | B60K 1/04 |
| 2001/0052433 | A1 | 12/2001 | Harris et al. | |
| 2002/0060100 | A1 * | 5/2002 | Nagura | B60K 15/063 180/65.1 |
| 2003/0070850 | A1 | 4/2003 | Reid et al. | |
| 2004/0058215 | A1 | 3/2004 | Bruck et al. | |
| 2004/0062955 | A1 | 4/2004 | Kubota et al. | |
| 2005/0031912 | A1 | 2/2005 | Ovshinsky et al. | |
| 2006/0102398 | A1 * | 5/2006 | Mizuno | B60K 15/063 429/430 |
| 2007/0087241 | A1 | 4/2007 | Mulvenna et al. | |
| 2009/0101422 | A1 | 4/2009 | Subramanian | |
| 2009/0246566 | A1 | 10/2009 | Craft, Jr. et al. | |
| 2011/0214930 | A1 | 9/2011 | Betts et al. | |
| 2011/0233996 | A1 | 9/2011 | Kato et al. | |
| 2013/0078486 | A1 | 3/2013 | Chou et al. | |
| 2017/0288239 | A1 | 10/2017 | Wilkie | |
| 2018/0154996 | A1 | 6/2018 | Sako | |

FOREIGN PATENT DOCUMENTS

| | | | | |
|---|---|---|---|---|
| WO | WO-2004030968 A1 * | 4/2004 | | B60K 1/02 |
| WO | 2015/004419 A1 | 1/2015 | | |
| WO | 2017102449 A1 | 6/2017 | | |
| WO | 2019018679 A1 | 1/2019 | | |
| WO | 2019158173 A1 | 8/2019 | | |

* cited by examiner

ELECTRICALLY DRIVEN AUTOMOBILE WITH A POWER PACK AND RETROFIT THEREOF

CROSS-REFERENCE TO RELATED APPLICATION

This application is the U.S. national phase of PCT Application No. PCT/DK2020/050277 filed on Oct. 8, 2020, which claims the benefit of U.S. Provisional Application 62/923,677 filed on Oct. 21, 2019 and claims priority to DK Patent Application No. PA 2019 70654 filed on Oct. 21, 2019, the disclosures of which are incorporated in their entirety by reference herein.

FIELD OF THE INVENTION

The present invention relates to a vehicle and a hybrid electric power pack for the vehicle, especially an automobile, and a method of retrofitting an electric power pack.

BACKGROUND OF THE INVENTION

Batteries in automobiles imply a range that is limited to an extent which for long distance driving often is insufficient. If there is a good infrastructure along highways or urban roads with respect to recharging, long distances merely imply frequent stopping for recharging, as typical ranges are currently in the order of 200-300 km. In case that a trip is extending into remote areas, electric vehicles driven on battery alone is not a proper solution. For this reason, hybrid vehicles are available in which there is provided a gasoline engine in addition to a battery pack. However, gasoline engines are increasingly criticized for pollution. Accordingly, there is a need for providing sustainable technical hybrid solutions for automobiles.

US2013/0078486 discloses a hybrid energy pack with a battery and fuel cell system, including a fuel tank. The outer casing, inside which the battery and the fuel cell are provided, is insulated thermally against the environment. An air blower and a heat exchanger are used for an air control system.

Although, this system is a step in the right direction, it is not a sufficiently good solution because the heat from the fuel cell influences the heat of the battery, and the fact that the common air flow for cooling is used for battery and fuel cell makes temperature regulation of the battery relatively to the fuel cell difficult. This is especially so if the system would be used for fuel cells operating at high temperature.

Hybrid power packs primarily for lifting trucks are disclosed in US2003/0070850, US2001/0052433 and US2007/0087241, where the fuel tank is integrated in the power pack. US2017/0288239 discloses a power generator replacement and discusses the air flow for cooling as well as insulation against the environment. Cooling is also discussed for a power cabinet in US2009/0246566.

US2004/0062955 discloses an automobile with a hybrid power pack containing batteries and a fuel cell system with an insulating wall in between. This system is not sufficiently advanced for all types of fuel cell systems and also not for high power batteries that provide large amounts of heat.

Coolant flow systems for batteries and fuel cell systems in automobiles are discussed in WO2017/102449 and EP3474368. US2005/0031912 discusses electrode details of a fuel cell system in a vehicle. US2018/0154996 discloses a boat comprising a two-compartment system with a fuel cell and tank in one compartment and batteries and electronics in the other compartment.

It would be desirable to find better solutions, especially in view of a constant need for improvement of battery-driven cars with respect to range and technical optimization. In particular, it would be desirable to find an improved technical solution when using high temperature fuel cells in combination with batteries.

DESCRIPTION OF THE INVENTION

It is an objective to provide an improvement in the art. In particular, it is an objective to provide an improved hybrid system based on batteries and fuel cells for vehicles, especially automobiles. These and more objectives are achieved with a system and method as described in the claims and in more detail in the following.

For propulsion, the vehicle, especially automobile, comprises batteries inside a casing that forms an enclosure around the components of an electrical power pack configured for providing power to the electrical motors that rotate the wheels. Typically, the power pack is dimensioned to provide power enough for electrically propelling the vehicle over a minimum range of distance of more than 100 km.

In some aspects of the invention, an electric power pack in an electrically powered vehicle is modified in that part of the batteries in the casing are substituted by a fuel cell system. For example, more than half of the batteries are removed from the casing, optionally at most 80% are removed, and the fuel cell system is installed inside the casing as a replacement for the removed batteries in the space of the removed batteries. Optionally, 20-45% of the batteries are maintained in the casing.

An advantage of the retrofit into the already existing casing is that no dimensions have to be changed for the vehicle. The casing can be re-used. For example, the casing has a width in the range of 1 to 3 m. Optionally, the length is in the range of 1 to 4 m. A typical height of the casing is in the range of 0.1 to 0.4 m.

As an alternative retrofit, the existing battery power pack of the vehicle is removed from the vehicle and substituted by a hybrid exchange power pack in which batteries as well as a fuel cell system are provided. For example, the existing casing is substituted by a casing that is dimensioned identically or similarly in order for the exchange power pack to fit into the same position and orientation as the power pack prior to retrofit. For example, it is made sure that the new casing fits properly into the frame on the chassis for the power pack.

Thus, in some cases, the vehicle is propelled by power from the power pack during multiple discharge and charging cycles of the batteries prior to the retrofitting. In other words, in a pre-retrofit stage, the electrical motors of the vehicle are supplied with electrical energy only from the batteries, since the vehicle does not yet comprise the fuel cell system. Only after a while of operation, the system is changed by mounting the fuel cell into the casing, and the operation of the vehicle continues with the combination of the battery and the fuel cell system in the post-retrofit power pack. For example, an objective for the retrofit is to extend the travelling range of the vehicle.

For the retrofit power pack, a fuel cell system is provided in addition to batteries inside the casing and electrically connected to the batteries in the casing for charging the battery by the fuel cell system and for providing electrical power by the fuel cell for the electrical engines, such as electrical engines of the wheels. After retrofit, the vehicle is propelled with a hybrid power system inside the casing, the hybrid power system comprising the batteries inside the casing and the fuel cell system inside the casing.

The fuel cell system comprises a fuel cell, typically a fuel cell stack. Herein, the term fuel cell is used for a single fuel cell as well as for multiple fuel cells, typically a fuel cell stack. The fuel cell comprises an anode side and a cathode side and a proton exchange membrane therein between for transport of hydrogen ions from the anode side to the cathode side through the membrane during operation.

For example, the fuel cell is of the type that operates at a high temperature. The term "high temperature" is a commonly used and understood term in the technical field of fuel cells and refers to operation temperatures above 120° C. in contrast to low temperature fuel cells operating at lower temperatures, for example at 70° C. For example, the fuel cell operates in the temperature range of 120-200° C.

For example, the fuel cell in the fuel cell system is a high temperature polymer electrolyte membrane fuel cell, (HT-PEM), which operates above 120 degrees centigrade, differentiating HT-PEM fuel cell from low temperature PEM fuel cells, the latter operating at temperatures below 100 degrees, for example at 70 degrees. The normal operating temperature of HT-PEM fuel cells is the range of 120 to 200 degrees centigrade, for example in the range of 160 to 170 degrees centigrade. The polymer electrolyte membrane PEM in the HT-PEM fuel cell is mineral acid based, typically a polymer film, for example polybenzimidazole doped with phosphoric acid. HT-PEM fuel cells are advantageous in being tolerant to relatively high CO concentration and are therefore not requiring PrOx reactors between the reformer and the fuel cell stack, why simple, lightweight and inexpensive reformers can be used, which minimizes the overall size and weight of the system in line with the purpose of providing compact fuel cell systems, for example for automobile industry.

During normal operation, the cooling circuit is taking up heat from the fuel cell in order to keep the temperature stable and in an optimized range. For example, the temperature of the fuel cell is 170 degrees, and the first coolant has a temperature of 160 degrees at the entrance of the fuel cell.

Especially for the case in which the fuel cell is a high temperature fuel cell, there is a risk of the temperature of the battery being difficult to control, as the heat produced by the fuel cell system inside the casing would be transferred to the batteries with the risk of damage.

Therefore, in general, a hybrid electric power pack for an electrically driven vehicle is provided, for example for the above-mentioned retrofit, but also possible for a basic installation as a hybrid power pack, where the power pack comprises a casing inside which batteries are provided as well as a fuel cell as well as a cooling circuit for adjustment of the temperature of the fuel cell. When using a mix of alcohol and water as fuel, also a reformer system is provided for catalytic reaction of fuel into syngas for the fuel cell. The batteries and the fuel cell system are electrically interconnected for recharging the batteries by the fuel cell system. As a special feature, in particular when containing a high temperature fuel cell system, the casing comprises a first compartment that contains the batteries and at least one further compartment containing the fuel cell system, wherein a first thermally insulating wall is provided between the first compartment and the at least one further compartment, wherein the first thermally insulating wall is thermally separating the first compartment from the at least one further compartment.

For example, the first compartment with the batteries has a volume in the range 20-45% of the total volume of the casing.

In some further embodiments, the at least one further compartment comprises at least two further compartments, wherein one of the compartments contains the fuel cell and another compartment an electronic control system for power management of the fuel cell and the batteries, wherein further thermally insulating walls are provided and thermally separating the at least two compartments in the casing from each other. By insulating the electronics as well as the battery from the high temperature fuel cell system, the temperature of the components in the various heat-insulated compartments can be precisely and individually controlled.

This is possible even when using a single cooling circuit, as the flow of the coolant, which is also a heating medium in certain circumstances, for example during startup, can be controlled with respect to individual flow rates through the various compartments. Therefore, in a further embodiment, the cooling circuit is configured for adjustment of the temperature of the fuel cell and adjustment of the temperature of the batteries by control of flow of coolant from the cooling circuit through the fuel cell and by separate control of flow of coolant through the batteries.

Optionally, alcohol is used as part of the fuel for the fuel cell, for example a mix of methanol and water. In a heated reformer, the fuel is catalytically reacted into syngas for the fuel cell for providing the necessary hydrogen gas to the anode side of the fuel cell. For the catalytic reaction in the reformer, the provided liquid fuel is evaporated in an evaporator that is conduit-connected to the reformer.

For heating the reformer to the proper catalytic conversion temperature, for example in the range of 250-300 degrees, a reformer burner is provided and in thermal contact with the reformer for transfer of heat to the catalyser inside the reformer. The reformer burner comprises a burner-chamber providing flue gas by burning anode waste gas or fuel or both. For example, the reformer burner provides flue gas at a temperature in the range of 350-400 degrees.

The reformer comprises a catalyser inside a reformer housing, which has reformer walls. For example, the flue gas from the reformer burner is passing along the reformer walls and heats them. In such embodiment, the burner-chamber is in fluid-flow communication with the reformer walls for flow of the flue gas from the burner-chamber to and along the reformer walls for transfer of heat from the flue gas to the reformer walls.

After the transfer of the thermal energy from the flue gas to the reformer walls, remaining thermal energy can be used for heating other components, for example heating the vehicle cabin. The reformer burner is configured for providing flue gas by burning anode waste gas or fuel or both.

For example, the reformer and reformer burner are provided as a compact unit. Optionally, in order to provide one way of a compact burner/reformer unit, the reformer walls are tubular and surround the burner walls. However, this is not strictly necessary, and a serial configuration, or a side-by-side configuration of the burner/reformer or a configuration of a burner sandwiched between two sections of the reformer is also possible.

In order for insulating the other components thermally against the radiated heat from the reformer burner and the reformer, optionally a fourth compartment with the reformer and the reformer burner is provided, and also insulated and thermally separated from the other compartments by a further thermally insulating and thermally separating wall.

As source for oxygen gas in the fuel cell, air is typically used and provided to the cathode side. In this case, an air supply is provided for supplying air to the cathode side.

Optionally, prior to entering the fuel cell, the air is heated by an air heating system for increasing the temperature of the air. The air provides the oxygen for the fuel cell. Other gases of the air merely flow through the system and are discarded again.

Typically, in fuel cell systems, coolant is glycol based. However, for automobiles in cold areas, glycol is not optimum for the start-up, why other liquids are preferred. Examples of such other liquids include synthetic oils.

In some useful embodiments, the system comprises a startup heater for heating the fuel cell system during startup conditions prior to normal power producing fuel cell operation. During startup of the fuel cell system, the fuel cell has to be heated up for reaching a steady state electricity-producing state. Especially for use in vehicles, the start-up procedure should be fast. Typically, this is done in practice by transferring the heat from the startup burner gas to the coolant in the cooling cycle which during start-up is used as heating fluid, instead, in order to heat up the fuel cell to a temperature suitable for normal power producing operation.

Related Aspects

Some interdependent aspects are described in the following and related to the description herein.

Aspect 1. A method for retrofitting an electric power pack in an electrically powered vehicle, for example an automobile, the power pack comprising a casing and batteries inside the casing for providing power to the electrical motors that rotate the wheels, the power pack being dimensioned to provide power enough for electrically propelling the vehicle over a minimum range of a distance of more than 100 km, wherein the method comprises retrofitting the power pack by either modifying the power pack of the vehicle or by removing the power pack from the vehicle and installing an exchange power pack into the vehicle; wherein the method comprises providing a fuel cell system inside the casing of the power pack or inside the casing of a similarly dimensioned retrofit casing of the exchange power pack, the fuel cell system being provided in addition to batteries inside the casing and being electrically connected to the batteries in the casing for charging the battery by the fuel cell system and for providing electrical power by the fuel cell for the electrical engines, wherein the method further comprises propelling the vehicle after retrofit with a hybrid power system inside the casing, the hybrid power system comprising the batteries inside the casing and the fuel cell system inside the casing.

Aspect 2. A method according to aspect 1, the method further comprising propelling the vehicle by power from the power pack during multiple discharge and charging cycles of the batteries prior to the retrofitting.

Aspect 3. A method according to aspect 2, wherein the method comprises retrofitting the power pack of the vehicle by removing more than half but not more than 80% of the batteries from the casing and installing the fuel cell system inside the casing as a replacement for the removed batteries in the space of the removed batteries.

Aspect 4. A method according to any preceding aspect, wherein the casing comprises a first compartment that contains the batteries and at least one further compartment containing the fuel cell system, wherein the method comprises providing a thermally insulating wall between the first compartment and the at least one further compartment and thermally separating the first compartment from the at least one further compartment of fuel cell system by the first thermally insulating wall.

Aspect 5. A method according to aspect 4, wherein the at least one further compartment comprises at least two further compartments, wherein one of the compartments contains the fuel cell and another compartment an electronic control system for power management of the fuel cell and the batteries, wherein the method comprises providing further thermally insulating walls and thermally separating the at least two compartments in the casing from each other by the further thermally insulating walls.

Aspect 6. A method according to any preceding aspect, wherein a cooling circuit is provided and the method comprises adjusting the temperature of the fuel cell and adjusting the temperature of the batteries using the same cooling circuit by controlling flow of coolant from the cooling circuit through the fuel cell and separately controlling flow of coolant from the cooling circuit through the battery.

Aspect 7. A method according to anyone of the preceding aspects, wherein the fuel cell is a high temperature polymer electrolyte membrane HT-PEM fuel cell, and the method comprises operating the fuel cell at a temperature in the range of 120-200° C. with evaporated fuel that is a mix of alcohol and water.

Aspect 8. Use of the method according to any preceding aspect for extending the range of an electric vehicle.

Aspect 9. A hybrid electric power pack for an electrically driven vehicle, the power pack comprising a casing inside which batteries are provided as well as a fuel cell system, the fuel cell system at least comprising a fuel cell and a cooling circuit for adjustment of the temperature of the fuel cell, wherein the batteries and the fuel cell system are electrically interconnected for recharging the batteries by the fuel cell system; wherein the casing comprises a first compartment that contains the batteries and at least one further compartment containing the fuel cell system, wherein a first thermally insulating wall is provided between the first compartment and the at least one further compartment, wherein the first thermally insulating wall is thermally separating the first compartment from the at least one further compartment.

Aspect 10. A hybrid energy pack according to aspect 9, wherein the at least one further compartment comprises at least two further compartments, wherein one of the compartments contains the fuel cell and another compartment an electronic control system for power management of the fuel cell and the batteries, wherein further thermally insulating walls are provided and thermally separating the at least two compartments in the casing from each other.

Aspect 11. A hybrid energy pack according to aspect 9 or 10, wherein the cooling circuit is configured for adjustment of the temperature of the fuel cell and adjustment of the temperature of the batteries by control of flow of coolant from the cooling circuit through the fuel cell and by separate control of flow of coolant through the battery.

Aspect 12. A hybrid energy pack according to anyone of the aspects 9-11, wherein the fuel cell is a high temperature polymer electrolyte membrane HT-PEM fuel cell, configured for operating at a temperature in the range of 120-200° C., and wherein the fuel is a mix of methanol and water.

Aspect 13. A vehicle comprising a hybrid energy pack according to anyone of the aspects 9-12.

Aspect 14. A vehicle according to aspect 13, wherein the coolant is oil-based for maintaining flow-capabilities at subzero temperatures.

DESCRIPTION OF THE DRAWING

Embodiments of the invention will be described in the figures, wherein.

DETAILED DESCRIPTION OF THE INVENTION

Figure 1:
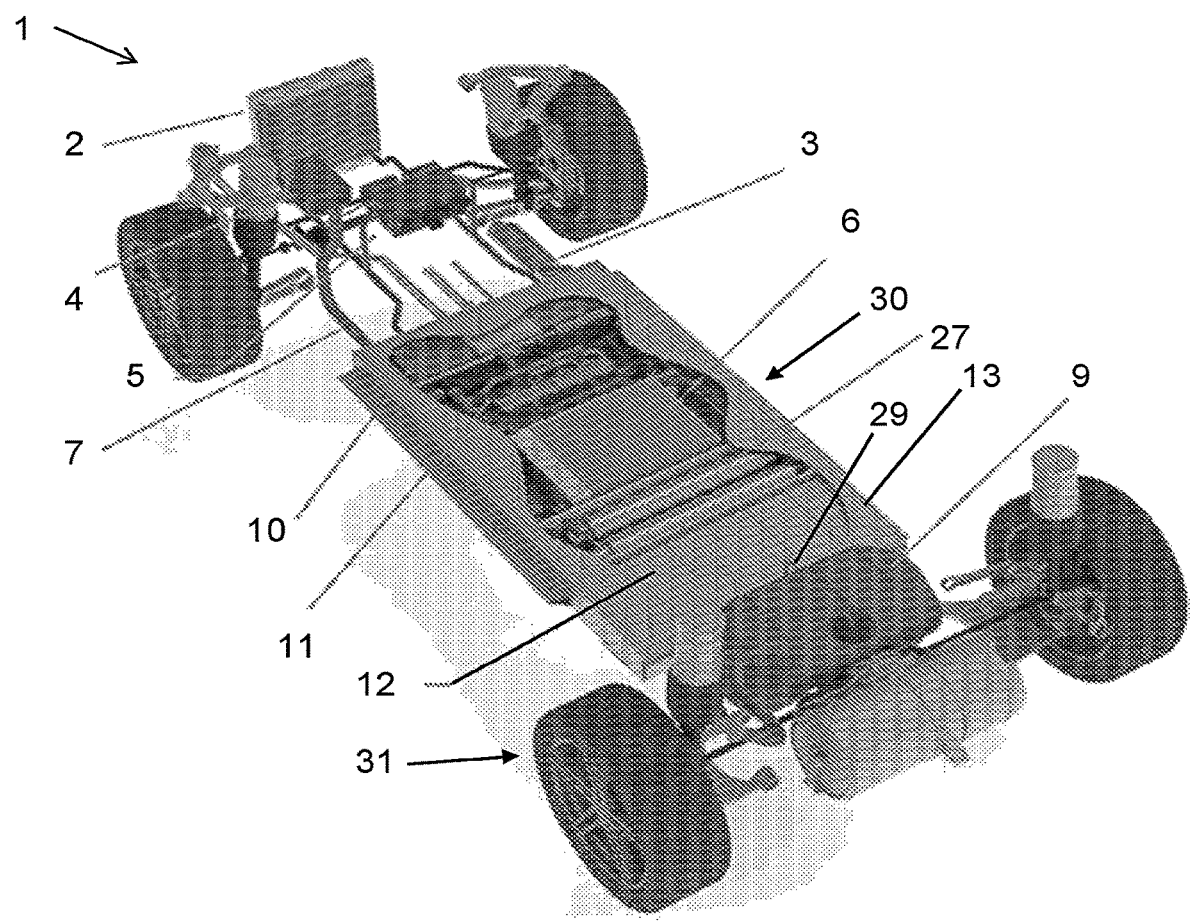
FIG. 1 illustrates a chassis of an automobile with a hybrid energy pack.

FIG. 1 illustrates a chassis 1 of a vehicle in the form of an automobile, where a power pack 30 is equipped with a fuel cell stack 6 and a battery 12.

Figure 2:
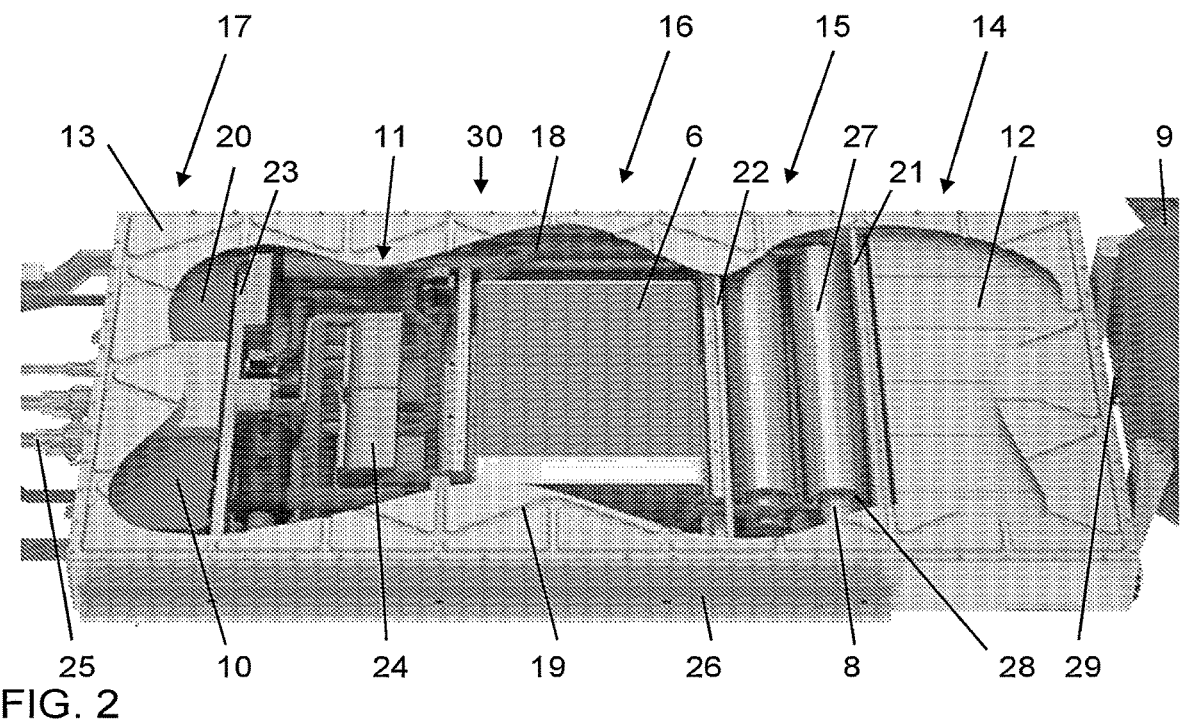
FIG. 2 illustrates the hybrid energy pack in greater detail.

FIG. 2 illustrates details of the power pack 30. The fuel cell system and the batteries 12 are contained in a box-shaped casing 13 with walls 19 forming bottom and top and sides to form an enclosure, preferably insulating enclosure. As best seen in FIG. 2, the casing 13 is held inside a frame 26. The frame 26 is configured such that the power pack 30 can be demounted from the automobile and substituted by a similar sized retrofit power pack 30.

The fuel cell system comprises a fuel cell stack 6, a combination 27 of the reformer 8 and corresponding reformer burner 28, and a temperature regulation system 11, including a cooling circuit 18. In addition, a power management system 10 is provided. Fuel is provided from a fuel tank 9. The fuel tank 9 is separate and remote from the casing 13 of the power pack 30 and feeds fuel to the power pack 30 through a fuel pipe 29. For example, the fuel tank 9 contains alcohol, optionally methanol, to which water is added prior to catalytic transformation in a reformer for providing it as hydrogen fuel to the fuel cell. However, in principle, it is also possible that the fuel tank 9 comprises hydrogen gas.

The battery 12 changes temperature during charging and discharging relatively to an idle state. The reformer 8 has to be heated by a reformer burner in order to convert the liquid fuel, for example methanol and water into syngas for providing hydrogen gas the fuel cell 6. This produces substantial amounts of heat.

As an example, in the reformer 8, the mix of methanol $CH_3OH$ and water $H_2O$ is catalytically converted into hydrogen gas $H_2$ and $CO_2$. Simplified, the methanol $CH_3OH$ is converted into $2H_2$ and CO, and the water molecule splits into $H_2$ and O, where the oxygen is captures by the CO to produce $CO_2$. The mix of $H_2$ and $CO_2$ is then supplied as so-called syngas to the anode side of the fuel cell, typically fuel cell stack 6. Air from the environment is drawn in through an air filter 4 and through air intake pipe 7 and supplied to the cathode side of the fuel cell 6 in order to provide the necessary oxygen for the reaction with the hydrogen to produce water, after hydrogen ions H+ have passed the membrane from the anode side to the cathode side.

Advantageously, the fuel cell 6 is a high temperature polymer electrolyte membrane (HT-PEM) fuel cell. Typically, high temperature fuel cells operate in the temperature range of 120-200° C., and thus are producing heat as well. For example, the fuel cell 6 operates at a temperature of 175° C. This operation temperature is held constant by a correspondingly adjusted flow of first coolant in a cooling circuit 18 through the fuel cell 6. For example, the temperature of the first coolant at the coolant inlet of the fuel cell 6 is in the range of 160° C. to 170° C.

In order to control the temperature of the individual components, the components are separated into compartments of the box 13. In a first compartment 14, the batteries 12 are provided. A separate compartment 15 is provided for the combined reformer 8 and burner 28. A third compartment 16 is for the fuel cell stack 6 and the temperature regulation system and the main components of the cooling circuit 18. A fourth compartment 17 houses the power management system 10.

Between the first compartments 14 with the battery 14 and the fuel cell system 6, 8, 11 a first insulating wall 21 is provided. This first insulating wall 21 insulates and thermally separates the battery 12 from the heat that is produced by the fuel cell system, including the fuel cell stack 6 and the reformer 8 and its burner 28. By thermally separating the compartments of the fuel cell system from the first compartment of the battery 12 by a first insulating wall 21, the temperature of the battery 12 and the fuel cell system 6, 8, 11 can be adjusted better and more precise than without the first insulating wall 21.

By regulating the flow from the cooling circuit 18 with respect to each of the heat-producing components 6, 8, 12, a thorough control is obtained for the system. Flow meters and valves as well as temperature gauges electronically, electrically and functionally connected to a controller allows a proper computerized management of the temperature of each of the components.

In order to even control the temperature of the fuel cell stack more precisely, a second insulating wall 22 is provided between the fuel cell stack and the reformer 8 with its burner 28. This is another advantageous feature, as it allows a precise adjustment and maintenance of the correct temperature of the fuel cell.

Electronics are influenced by high temperature and should be thermally protected. For this reason, a third insulating wall 23 is provided between the fourth compartment 17 with the electronic power management system 10 from the fuel cell system, including the third compartment 16 that houses the fuel cell stack 6 and the second compartment 15 that contains the reformer 8.

In order to remove heat from the fuel cell system, the coolant is flowing through a radiator 2, for example in the front of the vehicle, which is a common way of releasing thermal energy from the system. Some of the heat can be used for heating the cabin, which is regulated in a controller 5 for air condition and heating. However, the precise temperature of the fuel cell system 6, 8 and the battery 12 is controlled in a controller 20 for the temperature management, which also controls the flow of the coolant through the various components.

Advantageously, the fuel cell system comprises a startup heater 24 for providing thermal energy to raise the temperature of the fuel cell system to the correct temperature for power-producing operation.

For connection to the radiator 2 and for receiving fuel from the fuel tank 9, as well as delivering electrical power, the power pack has corresponding connectors 25.

REFERENCE NUMBERS

1 Chassis
2 Radiator
3 Air exhaust
4 Air filter
5 Aircon and heat controller
6 Fuel cell stack
7 Air intake
8 Reformer
9 Fuel tank 10 Power management system
11 Temperature regulation system
12 Battery
13 Box-shaped casing
14 first compartment for the batteries 12,
15 second compartment for the combined reformer and burner 8,
16 third compartment for the fuel cell stack 6
17 fourth compartment for the power management system 10
18 cooling circuit
19 casing of box 13
20 controller for temperature management
21 first insulating wall
22 second insulating wall
23 third insulating wall
24 startup heater
25 connectors
26 frame
27 combination of reformer 8 and reformer-burner 28
28 reformer-burner
29 fuel pipe from tank 9 to power pack 30
30 power Pack
31 wheels

The invention claimed is:

1. A method of extending the range of an electrically powered automobile by retrofitting an electric power pack in the automobile, the power pack of the automobile, prior to retrofit, comprising a casing and batteries but no fuel cell inside the casing for providing power to electrical motors that rotate wheels of the automobile only by the batteries, the batteries of the power pack being dimensioned to provide power enough for electrically propelling the automobile over a minimum range of a distance of more than 100 km, wherein the method comprises retrofitting the power pack by either modifying the power pack of the automobile or by removing the power pack from the automobile and installing an exchange power pack into the automobile; wherein the retrofitted power pack has electrical connectors for delivering electrical power to the electrical motors; wherein a fuel tank is provided as part of the automobile separate from the retrofitted power pack;

wherein the method, as part of the retrofit, comprises providing a fuel cell system inside the casing of the modified power pack or inside the casing of a similarly dimensioned retrofit casing of the exchange power pack, the fuel cell system being provided in addition to the batteries inside the casing and being electrically connected to the batteries in the casing for charging the batteries inside the casing by the fuel cell system and for providing electrical power by the fuel cell for the electrical motors, wherein the method further comprises propelling the automobile after retrofit with a hybrid power system inside the casing, the hybrid power system comprising batteries inside the casing and the fuel cell system inside the casing; wherein the retrofitted power pack has fuel connectors for receiving fuel for the fuel cell through a fuel pipe from the fuel tank and coolant connectors for connecting to a cooling radiator of the automobile and for circulation of cooling liquid through the power pack;

wherein the casing of the power pack after retrofit comprises a first compartment that contains the batteries and at least one further compartment containing the fuel cell system with a thermally insulating wall between the first compartment and the at least one further compartment for thermally separating the first compartment from the at least one further compartment of fuel cell system by the first thermally insulating wall, wherein the at least one further compartment comprises at least two further compartments with thermally insulating walls for separating the at least two further compartments in the casing from each other by the further thermally insulating walls, wherein one of the further compartments contains the fuel cell and another compartment contains a power management system, which is an electronic control system for power management of the fuel cell and the batteries;

wherein the fuel cell is a high temperature polymer electrolyte membrane HT-PEM fuel cell, wherein the retrofitted power pack contains a reformer for catalytic reaction of alcohol and water into syngas for the fuel cell;

wherein the method comprises after retrofitting providing alcohol in the fuel tank,
receiving the alcohol from the fuel tank by the power pack,
using the reformer for catalytic reaction of an evaporated mix of the alcohol and water into syngas, and providing the syngas to the fuel cell,
operating the fuel cell at a temperature in the range of 120-200° C.

2. The method according to claim 1, the method further comprising propelling the automobile by power from the power pack prior to the retrofitting during multiple discharge and charging cycles of the batteries.

3. The method according to claim 1, wherein the method comprises retrofitting the power pack of the automobile by removing more than half but not more than 80% of the batteries from the casing and installing the fuel cell system inside the casing as a replacement for the removed batteries in the space of the removed batteries.

4. The method according to claim 1, wherein a cooling circuit is provided inside the casing after retrofit and the method comprises adjusting the temperature of the fuel cell and adjusting the temperature of the batteries using the same cooling circuit by controlling flow of coolant from the cooling circuit through the fuel cell and separately controlling flow of coolant from the cooling circuit through the batteries.

5. The method according to claim 1, wherein the fuel cell system comprises a reformer burner in thermal contact with the reformer for transfer of heat to a catalyser inside the reformer, wherein the reformer burner comprises a burner-chamber providing flue gas by burning anode waste gas or fuel or both, wherein, for insulating the other components, including the electronic control system, thermally against the radiated heat from the reformer burner and the reformer, a fourth compartment with the reformer and the reformer burner is provided and also insulated and thermally separated from the other compartments by a further thermally insulating and thermally separating wall.

6. An electrically driven automobile comprising a hybrid electric power pack, the power pack comprising a casing inside which batteries are provided as well as a fuel cell system, the fuel cell system at least comprising a fuel cell and a liquid cooling circuit for adjustment of the temperature of the fuel cell, wherein the batteries and the fuel cell system are electrically interconnected for recharging the batteries by the fuel cell system; wherein the casing comprises a first compartment that contains the batteries and at least one further compartment containing the fuel cell system, wherein a first thermally insulating wall is provided between the first compartment and the at least one further compartment, wherein the first thermally insulating wall is thermally separating the first compartment from the at least one further compartment, wherein the automobile comprises a fuel tank separate from the power pack;
  wherein
    the power pack has coolant connectors for connecting to a cooling radiator of the automobile and for circulation of cooling liquid through the power pack;
    the power pack has electrical connectors for delivering electrical power to the electrical motors and fuel connectors for receiving fuel for the fuel cell through a fuel pipe from the fuel tank;
    the power pack contains a reformer for catalytic reaction of alcohol and water into syngas for the fuel cell;
    the fuel cell is a high temperature polymer electrolyte membrane HT-PEM fuel cell, configured for operating at a temperature in the range of 120-200° C.;
    the at least one further compartment comprises at least two further compartments, wherein one of the compartments contains the fuel cell and another compartment an electronic control system for power management of the fuel cell and the batteries, wherein further thermally insulating walls are provided and thermally separating the at least two further compartments in the casing from each other.

7. The automobile according to claim 6, wherein the cooling circuit is configured for adjustment of the temperature of the fuel cell and adjustment of the temperature of the batteries by control of flow of coolant from the cooling circuit through the fuel cell and by separate control of flow of coolant through the battery.

8. The automobile according to claim 6, wherein the fuel cell system comprises a reformer as well as a reformer burner in thermal contact with the reformer for transfer of heat to a catalyser inside the reformer, wherein the reformer burner comprises a burner-chamber providing flue gas by burning anode waste gas or fuel or both, wherein, for insulating the other components including the electronic control system thermally against the radiated heat from the reformer burner and the reformer, a fourth compartment with the reformer and the reformer burner is provided and also insulated and thermally separated from the other compartments by a further thermally insulating and thermally separating wall.

* * * * *

UNITED STATES PATENT AND TRADEMARK OFFICE
CERTIFICATE OF CORRECTION

| | |
|---|---|
| PATENT NO. | : 11,654,784 B2 |
| APPLICATION NO. | : 17/769915 |
| DATED | : May 23, 2023 |
| INVENTOR(S) | : Mads Bang et al. |

It is certified that error appears in the above-identified patent and that said Letters Patent is hereby corrected as shown below:

In the Claims

Column 12, Lines 10-11, Claim 8:
After "wherein the fuel cell system comprises"
Delete "a reformer as well as".

Signed and Sealed this
Sixth Day of August, 2024

Katherine Kelly Vidal
*Director of the United States Patent and Trademark Office*